United States Patent [19]

Thompson et al.

[11] Patent Number: 5,186,732
[45] Date of Patent: Feb. 16, 1993

[54] ENCAPSULATED SLOW RELEASE FERTILIZERS

[75] Inventors: Harold E. Thompson; Richard A. Kelch, both of Columbus, Ohio

[73] Assignee: The O. M. Scott & Sons Company, Marysville, Ohio

[21] Appl. No.: 791,037

[22] Filed: Nov. 12, 1991

Related U.S. Application Data

[62] Division of Ser. No. 497,442, Mar. 22, 1990, Pat. No. 5,089,041.

[51] Int. Cl.$^5$ .................. A01N 25/26; C05G 5/00
[52] U.S. Cl. .................. 71/64.11; 71/64.12; 71/64.13; 71/35; 71/59; 71/61; 71/DIG. 1; 427/213; 428/402.24; 514/772; 514/964; 504/116
[58] Field of Search .................. 71/64.11, 64.12, 64.13, 71/119, 59, 61, 65, DIG. 1; 427/213; 514/964

*Primary Examiner*—Richard L. Raymond
*Assistant Examiner*—B. Bembenick
*Attorney, Agent, or Firm*—Jones, Day, Reavis & Pogue

[57] ABSTRACT

A coated product comprising a water soluble core material having a water insoluble polymeric coating encapsulating said core and a process for the production thereof. The encapsulating coating comprising a waterborne, polyvinylidene chloride-based latex composition which provides for the release of the water soluble core material over an extended period of time.

25 Claims, No Drawings

ENCAPSULATED SLOW RELEASE FERTILIZERS

This is a divisional of copending application Ser. No. 07/497,442, filed Mar. 22, 1990, now U.S. Pat. No. 5,089,041.

BACKGROUND OF THE INVENTION

The present invention relates to controlled-release products of the slow release type and to processes for the production thereof and, in particular, to encapsulated or coated granular or particulate products which release their nutrient content at a slow, controlled rate over time.

Encapsulated fertilizers are known to be very effective and efficient sources of slow release nutrients for the long-term feeding of plants. The nutrients are released at slow, controlled rates through the fertilizer's coating resulting in a sustained feeding of the plants. As a result, one application of an encapsulated fertilizer can provide the necessary nutrients for a plant that would ordinarily take multiple applications of soluble fertilizers. In addition, encapsulated fertilizers can also be more efficient and cause less environmental concerns than soluble fertilizers due to their slow release of nutrients. Since the nutrients are released at a slow sustained rate rather than a sudden surge, more of the nutrients are absorbed by the plant and thus are not washed away or leached through the soil, where they can enter the ground water.

One type of slow release encapsulated fertilizer currently in wide use for both nursery and turf applications is sulfur coated fertilizer. Coating weights ranging from 15 to 35% by weight are applied to granular fertilizer in coating drums. There are two modes of release of the sulfur coated fertilizer's nutrients. The first is by diffusion through cracks and other imperfections in the sulfur coating. This allows the nutrients to be released rather quickly, and is the predominate mode of release for short-term fertilizer products. The second mode of nutrient release is through coating breakdown. This allows for the longer residual feeding of plants and thus is the primary mode of release for nursery-type sulfur coated fertilizers. The major advantage of the sulfur coated fertilizers is their relatively low cost. This is due to low raw material costs as well as inexpensive manufacturing costs associated with the coating drum process.

A second type of encapsulated slow release fertilizer utilizes solvent applied polymer coatings. For this type of encapsulated fertilizer, the polymer is first dissolved in an organic solvent and then sprayed onto the fertilizer base in either a coating drum or a fluid bed. As the solvent evaporates, a very uniform, continuous polymer film is left behind, forming the fertilizer's barrier coating. Examples of solvent applied polymer coated fertilizers which are currently in use in the nursery industry are disclosed in U.S. Pat. No. 4,019,890, issued to Fugita et al., Apr. 26, 1977 and U.S. Pat. No. 3,223,518 to Hansen on Dec. 14, 1965.

Another type of encapsulated fertilizer that exhibits good slow release properties is latex coated granular fertilizers such as those disclosed in U.S. Pat. No. 4,549,897 issued to Seng et al., on Oct. 29, 1985 and Korean Patent No. 88-153 issued to Mun et al., on Mar. 12, 1988. Such latex coated fertilizers are produced by first applying a sodium silicate precoat to the fertilizer core to protect it from dissolution caused by the water-borne latex. After precoating has been completed, a high molecular weight polymer latex top coat is applied to the precoated fertilizer core. As the water from the latex evaporates, a continuous film, similar to that left behind during solvent-applied polymer coating, is left surrounding the fertilizer granule. It is this latex top coat which gives the encapsulated fertilizer most of its sustained release properties.

Solvent and latex applied polymer encapsulated fertilizers both offer similar important benefits over sulfur coated products concerning consistency of release rates and the ability to provide extended fertilizer residuals. These benefits are chiefly due to the uniform, continuous, and rather defect-free film coating which surrounds the fertilizer core in each product type. These polymer coatings are also very tough and durable and generally are not prone to significant mechanical breakdown. In addition, the coatings are biologically inert and, thus, are not susceptible to breakdown resulting from microbial activity in the soil or other potting media. As a result, the majority of the nutrient release is by diffusion through the polymer coat, rather than release through imperfections and flaws or as a result of particle breakdown. This allows for a much more uniform and consistent nutrient release rate and, if the barrier properties of the polymer are sufficient, a longer residual nursery-type encapsulated fertilizer than sulfur coated products.

However, sulfur coated fertilizers offer certain advantages over soluble fertilizers such as providing somewhat slower release of nutrients, and being less costly than other encapsulated fertilizers. Conversely, there are some disadvantages to the sulfur coated fertilizers, which, as a result of imperfections and coating degradation, tend to be highly variable and lead to inconsistencies in the product's release rate. As the number of coating imperfections increases, so does the fertilizer's nutrient release rate. In addition, the sulfur coating is fairly brittle. With increased handling, the coating breaks down causing further variability and increase in the nutrient release rate.

Another inherent disadvantage of sulfur coated fertilizers is the problem with soil acidulation. As the sulfur coating begins to break down, the free sulfur combines with water to form an acid. This does not create a problem with turf applications where there is plenty of soil available to dilute the effect of the acid, but can be a problem with potted plants where the acid can significantly lower the potting media's pH, which can cause damage to the plants and retard their growth.

Solvent applied polymer encapsulated fertilizers, such as those disclosed in U.S. Pat. Nos. 4,019,890 and 3,223,518 also have problems associated therewith. For example, they require the use of organic solvents to dissolve the polymers before they can be applied to the fertilizer core. This presents an economic disadvantage for the solvent-based polymer encapsulation processes in addition to presenting potential health and environmental hazards.

Organic solvents, such as those used for polymer dissolution, tend to be very expensive. To help offset this high cost, a solvent recovery system must be used in conjunction with the coating process to aid in the reduction of fresh solvent requirements. Although such a solvent recovery system does reduce the amount of fresh solvent required, thus lessening solvent costs, it increases the overall manufacturing conversion cost of the polymer coating process. As a result, the production costs for solvent applied polymer encapsulated fertilizers are higher than processes which do not use solvents thus presenting a problem of economics relative to such processes and their resulting products. In addition, the capital costs for a solvent recovery system are quite high which causes a further economic problem in regard to the commercial application of such encapsulation techniques.

Another problem presented by the implementation of solvent-based polymer encapsulation processes concerns health issues presented by the toxic nature of many organic solvents used therein. These solvents and the vapors they emit can be very harmful to humans. Most organic solvents also are very volatile, posing both fire and explosion hazards. Further, uncontained solvent spills outside the production facility and emissions of vapors into the atmosphere present potential environmental problems. As a result of these potential health and environmental issues, extra caution, as well as increased capital, must be allocated for such processes using organic solvents.

Prior latex encapsulated fertilizers as exemplified by those disclosed in Korean Patent No. 88-153 also have major problems associated therewith. The processing conditions taught therein combined with the physical properties of the water-borne latex top coat employed, do not enable water removal quickly enough to prevent dissolution of the soluble fertilizer core. Therefore, a hydrophobic precoat, such as sodium silicate, must first be applied to the fertilizer core protecting it from dissolution. Once the precoat has been applied, the latex top coat can be applied, but this two-stage coating operation causes a problem of economic feasibility by increasing both the raw material and operating costs which results in a significant increase in product cost.

SUMMARY OF THE INVENTION

It is a primary object of the present invention to provide controlled release products which combine low cost and minimal health and environmental risks with excellent slow rates of release.

It is a more specific object of this invention to provide encapsulated or coated granular or particulate products, especially fertilizer products, which are particularly effective for providing uniform and consistent controlled release of nutrients sustained over a long residual period of time.

A further object of this invention is to provide a relatively simple and economical process for the preparation of controlled release encapsulated or coated granular or particulate products such as fertilizer products.

The foregoing and other objects of the invention are achieved by providing latex encapsulated granular products which include water-borne, polyvinylidene chloride-based latexes as encapsulants or coatings for particulate water-soluble core materials such as fertilizer granules. In regard to encapsulated granular fertilizer products produced in accordance with the present invention, it has been found that such products exhibit nursery-type controlled release properties. Also, it is to be noted that such products are produced without the use of hydrophobic precoats which were previously considered to be essential to protect the water-soluble core material from dissolution resulting from the application of water-based latexes thereon.

The products of the present invention are prepared by coating a water-soluble granular core material such as a fertilizer material with a water-borne polyvinylidene chloride-based latex material. The latex material may be applied to the core by spray coating in a fluidized bed with hot air drying. In order to accommodate such processing, it has been found that the latex coating materials employed herein must possess certain characteristics in order to enable production of suitable coated or encapsulated products. For example, latexes suitable for use herein have been found to have low viscosity characteristics in order to enable low pressure spraying thereby reducing or eliminating shear related breakdown of the latex. Also, the latexes useful herein have been found to have a high solids content in order to avoid the need to utilize harsh drying conditions in the process. Furthermore, latexes suitable for use herein have been found to exhibit glass transition temperatures and blocking temperatures which result in the production of coated or encapsulated products without encountering agglomeration problems in the production thereof.

DETAILED DESCRIPTION

While the present invention is useful for the controlled release of a variety of active constituents it is primarily useful for the controlled release of fertilizers and accordingly, will be specifically described in connection with a water soluble fertilizer substrate. However, it is to be recognized that the invention is also applicable to the coating of other water soluble active constituents where prolonged or controlled release is desirable, including pesticides, herbicides, fungicides, growth regulators, insecticides and animal and insect repellents. Such active constituents are well known and examples are set forth in the literature. It is preferable that the active constituent be in solid, granular or particulate form and it should not decompose or melt at processing temperatures. In addition, the active constituent will normally be moderately to highly water soluble. Thus, a principle object in the use of the coated or encapsulated products of the present invention is to control the leaching of the active constituent therefrom with water.

The latex coating may be applied to the fertilizer by a number of methods. However, in a most preferred embodiment of this invention the latex is coated on the fertilizer granules by spray coating in a fluidized bed such as a Wurster column or similar device until the latex is distributed over the particles. Preferably, the spray coating is performed at an application rate of about 0.0025 grams latex per gram of fertilizer granule per minute to about 0.0083 grams latex per gram of fertilizer granule per minute utilizing a fluidizing air flow rate in the range of about 1-6 cubic meters per hour per gram of water to be removed from the coating and at a temperature in the range of about 35 degrees-60 degrees C.

After the coating of the latex over the particles is completed, the resulting coated product is, preferably, air dried. In accordance with this preferred method of the present invention, it has been found that latex coating weights of from about 4% to about 20% by weight and, more preferably, about 6-15% are effectively achieved.

Suitable latexes for use in the present invention as encapsulating coatings for the granular or particulate fertilizers have been found to include copolymer blends of predominately vinylidene chloride monomers and ethylenically unsaturated comonomers selected from the group consisting of methyl methacrylates, acrylonitriles and methyl acrylates. Other latexes suitable for use herein are vinylidene chloride-vinyl chloride copolymers and mixtures thereof.

Exemplary of particularly preferred water-borne, polyvinylidene chloride-based latex compositions for use herein are the emulsion polymerized vinylidene chloride copolymer latexes disclosed in U.S. Pat. 4,401,788; the disclosure of which is incorporated herein by reference. A latex of similar composition is sold under the trademark Daran SL112 by W. R. Grace & Co. and has the following properties: Total Solids—54%; pH-2; Particle Size—0.11 microns; viscosity (Brookfield RVT, No. 1 Spindle at 30 rpm)—<30 cps; Weight per Gallon—10.6 lbs.; Surface Tension—60-68 dynes/cm.; and Freezing Point—36 degrees F.

Another particularly advantageous vinylidene chloride based copolymer latex for use herein is sold by Solvay & Cie under the trademark IXAN WA 50, an aqueous anionic dispersion of a copolymer with a high content of vinylidene chloride, in the form of a milky white liquid of low viscosity having the following properties: Dry Solids Content—55 I 2%; Density—approximately 1.282 kg/dm$^3$; Surface Tension—29-34 dynes/cm.; pH—2-3.5; Dynamic Viscosity at 20 degrees C.—approximately 14 cP and Minimum Film-Forming Temperature—17 degrees-19 degrees C.

A further preferred latex for use herein as a coating for granular particles is sold by BF Goodrich Company under the trademark Geon 650X18, a uniform colloidal dispersion of vinyl chloride polymers and vinylidene chloride copolymers in water. Geon latexes are true colloids, having spherical particles, usually of 0.2 micron average diameter or smaller and are produced by emulsion polymerization.

Each of the foregoing latexes exhibits the necessary film forming properties and contains low concentrations of both anionic and nonionic surfactants. They also, have high solids contents (e.g., greater than 50% by weight solids) and demonstrate low, water-like viscosities (e.g. less than 30 cps), glass transition temperatures in the range of about 15 degrees C. to about 35 degrees C. and blocking temperatures of at least about 32 degrees C. The latexes employable herein further demonstrate very good moisture barrier properties to enable slow, controlled release of the fertilizer core nutrients.

Preferably, the vinylidene chloride based copolymer latexes useful in the present invention include from about 80 to about 92% by weight vinylidene chloride and from about 5 to about 14% by weight ethylenically unsaturated comonomers. With regard to these comonomers, on a percentage by weight basis, the methyl methacrylates are preferably present, in an amount of about 2.5-4%; the arylonitriles, in an amount of about 1-8% and the methyl acrylates, in an amount of about 1-2%. The comonomers help to reduce the crystallinity of vinylidene chloride and, also, improve the physical properties of the latexes. These latexes also contain between 0.05 and 0.5% by weight of an anionic surfactant from the group consisting of sodium alkylbenzenesulfonates, sodium salts of alkyl sulfonic acid esters, sodium salts of sulfosuccinic acid alkyl esters, sodium alkylsulfonates, sodium alkylidiphenylether sulfonates, sulfuric acid esters of alkylophenolpolyethylene oxides and mixtures thereof and from 3 to 5% by weight of a nonionic surfactant from the group consisting of alkylethers, alkylphenol ethers, fatty acid esters of polyethylene oxides and mixtures thereof. The surfactants add stability to latexes by keeping the polymers from agglomerating and improve resistance to shear which could cause the latexes to prematurely breakdown.

A critical property of these latexes, as applied to spray coating, is viscosity. A low viscosity allows for easy conveyance of the latex through tubes and piping at ambient temperatures. It also enables the latex to be sprayed onto the fertilizers at low pressures reducing the amount of shear encountered by latexes thus preventing shear related breakdown. The latexes used to coat the fertilizers of this invention have maximum viscosities of 30 centipoise. This is a sufficiently low viscosity to permit the latexes to be easily transported with little pressure requirements and sprayed with a minimum amount of shear.

High polymer solids content of the latexes is also a critical property for successful spray coating operations. When water is not removed quickly enough from the latexes as they are being applied, the partially coated granules become tacky causing reduced fluid bed movement and increased chances for bed agglomeration. Latexes with higher solids contents require less water removal, for an equal coating rate, than do low solids concentration latexes. In order to use latexes with low solids concentrations for coating processes, the fluidization/drying air must be heated to high temperatures to effectively remove the excess water. This additional heat causes further agglomeration concerns, as well as increasing the energy requirements for the coating process. By choosing a latex with a high solids content, such as the latexes used for this invention which have solids contents greater than 50% by weight, the water can easily be removed during coating without using harsh drying conditions.

The glass transition temperature ($T_g$) of a polymer, or copolymer blend, is the temperature below which there is virtually no molecular movement which causes the polymer to become rigid or crystalline-like. As the temperature of the polymer rises above the $T_g$, molecular movement begins and as the temperature continues to rise, increased molecular movement occurs, resulting in a more pliable polymer. This is important to the successful polymer encapsulation of fertilizers since polymer films, such as those formed around the fertilizer granules during the coating process, become softer and show increased tendencies towards tackiness as the degree of plasticity increases. At coating temperatures 20 degrees to 30 degrees C. above the glass transition temperature of latexes, the partially coated fertilizer granules become tacky and cause reduced particle movement in the fluidized bed. After several minutes of reduced bed movement, the fertilizer granules become agglomerated. Separation of the agglomerated particles can cause damage to the coating which destroys the controlled release properties of the encapsulated fertilizer. For this reason, the latexes employed herein for spray coating must have glass transition temperatures no lower than 20 degrees to 30 degrees C. below the desired operating conditions of the coating process.

However, latexes with high glass transition temperatures, those with $T_g$'s at or above the operating temperatures of the coating process, have also been found to present problems in use as encapsulants for the granular fertilizer cores herein. In this regard, it has been found that if the coating temperature is not somewhat above the $T_g$, of the latex, the latex will not coalesce properly, resulting in a film coating that is neither uniform nor continuous. Thus, it has been determined that the latexes used to prepare the polymer encapsulated fertilizers of this invention should have glass transition temperatures ranging from about 15 degrees to about 35 degrees C. Glass transition temperatures in this range are high enough to enable coating at temperatures between about 35 degrees and about 60 degrees C., the preferred coating and drying range of this invention, without causing agglomeration problems, yet low enough to allow for proper coalescence of the latex film, resulting in high quality coatings.

Another property of latexes that is important for fluid bed encapsulation of fertilizers is the minimum blocking temperature. The blocking temperature of a polymer film relates to the temperature above which a film will show signs of blocking, or sticking, when subjected to a force over a period time. As was the case with the glass transition temperature, a polymer will begin to show signs of tackiness as the minimum blocking temperature is exceeded. As the temperature continues to rise above the minimum blocking temperature, the film becomes more tacky, and less force is required to cause agglomeration between particles. Thus, the higher the blocking temperature of the latex, the less likely there will be any signs of blocking during coating. The minimum blocking temperature for the latexes used to prepare the encapsulated fertilizers of this invention have been found to be preferably about 32 degrees C. which is sufficiently high to avoid potential blocking problems at the desired coating temperature range.

The mechanism of nutrient release from an encapsulated fertilizer having a uniform, continuous, defect-free coating, such as polymer coated fertilizers, is based on diffusion through the polymer membrane. More specifically, the nutrient release is in a multi-stage process. First, water permeates from outside of the fertilizer granule, through the polymer membrane, and to the fertilizer core. Next, the water acts as a solvent to dissolve a portion of the soluble fertilizer core. Finally, the fertilizer and water solution must permeate back through the polymer coating, to the outside of the encapsulated granule, where the nutrients become available for plant usage. Since the fertilizer cores are generally very water soluble, the rate determining steps for this process are the permeation through the membrane to the core and back out through the membrane.

Thus, one of the most important film properties determining how effective the controlled, slow release properties of a fertilizer will be, is the moisture barrier abilities of the polymer. A polymer coating possessing good moisture barrier properties can greatly reduce the rate of nutrient discharge, while providing more consistent release. This results in an effective controlled release fertilizer with greater extended residual as compared with similar encapsulated fertilizers utilizing polymers with moderate barrier properties.

The novel fertilizers of the present invention employ vinylidene chloride based latexes for their barrier coating. Since vinylidene chloride films possess excellent barrier properties, and the latexes used for the encapsulated fertilizers of this invention preferably have such high VdC concentrations (80 to 92% by weight), the barrier properties of these latexes are exceptional. The maximum moisture vapor transmission rate (MVTR) for an 0.1 mil film of these latexes is 2.0 grams per 100 square inches per 24 hours at 100 degrees F. and 90% relative humidity. This MVTR is very low which indicates that the latexes used will provide coatings with excellent controlled, slow release properties resulting in very effective encapsulated fertilizers.

Accordingly, it is a significant feature of the present invention to provide encapsulated granular fertilizers which use particular latex compositions to form complete and continuous polymer film coatings around the fertilizer granules. The coatings are very tough and durable and are not subject to coating attrition or breakdown under normal processing and handling conditions. The coatings are also very uniform in thickness and essentially defect-free. As a result, virtually all of the nutrient release is by diffusion through a film membrane instead of by diffusion through coating imperfections or release caused by particle breakdown. Since the barrier properties of the latexes are very good, the barrier properties of the encapsulated products are also very good. Thus, the encapsulated fertilizers of the present invention have very consistent and controllable nutrient release rates rather than the constantly varying release patterns associated with other coated fertilizer products such as sulfur coated fertilizers.

It is another feature of the present invention that the polymer encapsulated fertilizers use water-borne latexes to apply polymer coating rather than a solvent-based polymer system. Accordingly, the problems associated with using organic solvents are avoided. The raw material costs of water-borne latexes are less than the combined cost of the solvents and polymers required for solvent-based coating processes. Furthermore, solvent applied polymer coating facilities incorporate solvent recovery systems to decrease raw material costs, but such systems add significantly to operating expenses. Latex based facilities do not require solvent recovery, thus they avoid this added expense and maintain production costs of latex encapsulated fertilizers at a relatively low level when compared to costs of solvent-based encapsulated fertilizers.

A further feature of the present invention utilizing a latex-based encapsulated fertilizer facility as opposed to a solvent system is the elimination of environmental and health concerns associated with the use of organic solvents. The latexes give off no harmful toxic vapors and are relatively safe to handle. There is also no danger of either fire or explosion hazards with the latexes since they are water-based. Additionally, the latexes do not give off any environmentally harmful vapors.

It is another significant feature of the present invention that the latex encapsulated fertilizers are produced by applying the latex coatings directly to the water soluble fertilizer cores without using hydrophobic precoats. More particularly, it has been found that the physical properties of the latexes utilized herein to produce the coatings preferably having high solids contents of 50% or more, glass transition temperatures between 15 degrees C. and 35 degrees C., and minimum blocking temperatures greater than 32 degrees C. enable the removal of the water content from the latex quickly enough, during coating, so that the fertilizer cores do not dissolve. In view of the elimination of the heretofore standard precoat, the first coating stage is likewise eliminated which results in a lower manufacturing cost for the present latex encapsulated fertilizers relative to previous precoated present fertilizers.

The following examples illustrate the practice of the invention. All parts are by weight unless otherwise indicated.

EXAMPLE 1

Granular urea, 400 grams, was added into a bench-scale fluidized bed Wurster column. A vinylidene chloride-based latex (Daran SL112), 130.7 grams, 70.6 grams on a dry solids basis, was applied to the fluidized urea by spraying from the bottom of the bed at a rate of 1.82 g./min. (0.00455 gram latex/gram fertilizer granule/minute). The fluidization/drying air flow rate was maintained between 118–120 m$^3$/hr. (2.35–2.39 m$^3$/gram of water removed) and entered the bed at a temperature of 47 degrees C. The air exited the bed between 40 degrees and 41 degrees C. The total coating time was 72 minutes which was followed by an additional 15 minutes of drying at an air inlet temperature of 47 degrees C. and an 18 minute cooling phase using ambient air resulting in a product having a 15% by weight vinylidene chloride-based latex coating on the granular urea.

EXAMPLE 2

A 5% by weight vinylidene chloride-based latex coated granular urea product was prepared in accordance with the procedures of Example 1 except that 380 grams of granular urea and 37.1 grams of Daran SL112 were used to make up the product; the latex was applied to the urea at a coating rate of 1.24 g./min. (0.00326 g. latex/g. fertilizer granule/min.); the fluidization/drying air flow rate ranged from 118 and 125 m$^3$/hr. (3.45–3.65 m$^3$/g. water removed) and the inlet temperature was maintained at 44 degrees C. The total coating time was 30 minutes followed by 16 minutes of additional drying at temperatures of from 44 degrees to 56 degrees C. and 14 minutes of cooling at ambient temperature.

EXAMPLE 3

An 8% by weight vinylidene chloride-based latex coated granular urea product was prepared in accordance with the procedures of Example 1 except that 380.0 grams of granular urea and 61.2 grams of Daran SL112 were used to make up the product; the latex was applied to the urea at a coating rate of 2.04 g./min. (0.00537 g. latex/g. fertilizer granule/min.). The fluidization/drying air flow rate ranged from 130 to 140 m$^3$/hr. (2.31–2.49 m$^3$/g. water removed) and the inlet temperature was maintained at 56 degrees C. Total coating time was 30 minutes followed by an additional 19 minute drying phase and 22 minutes of cooling at ambient temperature.

EXAMPLE 4

A 10% by weight vinylidene chloride-based latex coated granular urea product was prepared in accordance with the procedures of Example 1 except that 400.0 grams of granular urea and 86.0 grams of Daran SL112 were used to make up the product; the latex was applied at a spray rate of 1.43 g./min. (0.00358 g. latex/g. fertilizer granule/min.). The fluidization/drying air flow rate was maintained between 122 and 128 m$^3$/hr. (3.09–3.24 m$^3$/g. water removed) with an inlet temperature of 46 degrees C. Total coating time was 60 minutes followed by 18 minutes of drying at an inlet air temperature of 56 degrees C. and a 16 minute cooling phase at ambient temperature.

EXAMPLE 5

A 10% vinylidene chloride-vinyl chloride latex coated granular urea product was prepared in accordance with the procedures of Example 1 except that 360.0 grams of granular urea and 71.6 grams of Geon 650X18 were used to make up the product; the latex was spray coated onto the fluidized urea at a rate of 1.26 g./min (0.00350 g. latex/g. fertilizer granule/min.). The fluidizing/drying air entered the fluid bed at 36 degrees –37 degrees C. and an air flow rate was maintained between 126 to 130 m$^3$/hr. (3.70–3.82 m$^3$/g. of water removed), and the air exited the bed at 32 degrees–34 degrees C. Total coating time was 57 minutes which was followed by an 8 minute drying phase at an inlet air temperature of 36 degrees C. and 10 minutes of cooling using ambient air.

EXAMPLE 6

A 10% vinylidene chloride-based latex coated granular urea product was prepared in accordance with the procedures of Example 1 except that 360.0 grams of granular urea and 72.7 grams of IXAN WA 50 were used to make up the product; the latex was applied to the urea through the bottom spray assembly at a rate of 1.01 g./min. (0.00281 g. latex/g. fertilizer granule/min.). The fluidization/drying air flow rate ranged from 123 to 128 m$^3$/hr. (4.51–4.69 m$^3$/g. water removed) and entered the bed at 44 degrees–52 degrees C. while exiting at temperatures of from 39 degrees–42 degrees C. A 72 minute coating time was required to apply the 10% coating and was followed by a drying and a cooling phase.

EXAMPLE 7

An attempt was made to produce a 10% vinylidene chloride-butylacrylate latex coated granular urea product as a latex coated product not within the scope of the present invention for purposes of conducting comparative testing. For this purpose, 360.0 grams of granular urea fertilizer were added into a fluidized bed Wurster column and an attempt was made to apply 83.3 grams of vinylidene chloride-butylacrylate latex (48–50% solids by weight, 5 degrees C. glass transition temperature) to the urea through the bed's bottom spray assembly. The latex was applied at an average rate of 0.83 g./min. (0.00231 g. latex/g. fertilizer granule/min.). The fluidization/drying air flow rate was maintained at 118 ;m$^3$/hr. (4.65 m$^3$/g. water removed) and at an inlet temperature of 33 degrees C. Several minutes into the run, the partially coated urea granules began to agglomerate. As the run proceeded, the granules became more and more agglomerated. The coating was terminated after 36 minutes due to the agglomeration which had caused the bed to become totally stagnant. A total of 29.8 grams of the latex 14.3 grams on a dry solids basis) was applied to the urea resulting in a 3.8% latex coating rather than the anticipated 10% coating weight which should have been achieved with the amount of urea and latex employed. Furthermore, the coating produced was very tacky and appeared to be uneven.

EXAMPLE 8

A 9% by weight vinylidene chloride-based latex coated granular N-P-K fertilizer product was prepared in accordance with the procedure of Example 1 except that 450.0 grams of a granular N-P-K fertilizer with an analysis of 15-15-15 was placed into the fluid bed and 82.4 grams of Daran SL112 (44.5 grams on a dry solids basis) was applied to the fertilizer core at a rate of 3.05 g./min. (0.00678 g. latex/g. fertilizer granule/min.). The fluidization/drying air temperature was maintained at a temperature of 42 degrees–43 degrees C. at the air inlet, and at a rate of 120–123 m³/hr. (1.43–1.46 m³/g. water removed). The air exited the fluid bed at temperatures between 33 degrees and 36 degrees C. Following the completion of the latex coating process, the product was dried for 24 minutes at 42 degrees C. followed by 19 minutes of cooling with ambient air.

EXAMPLE 9

A 9% vinylidene chloride-based latex coated prilled potassium nitrate product was prepared in accordance with the procedure of Example 1 except that 450.0 grams of prilled potassium nitrate was charged into the fluidized bed Wurster column and 82.4 grams of Daran SL112 was sprayed onto the fluidized potassium nitrate at a rate of 3.58 g./min. (0.00796 g. latex/g. fertilizer granule/min.). The fluidization/drying air rate was maintained between 114 and 118 m³/hr. (1.15–1.19 m³/g. water removed). The air entered the bed at a temperature of 40 degrees–42 degrees C. and exited at 34 degrees C. After coating was completed, 8 minutes of drying was performed at 41 degrees C. followed by 17 minutes of cooling with ambient air.

EXAMPLE 10

A 10% vinylidene chloride-based coated granular potassium sulfate product was prepared in accordance with the procedure of Example 1 except that 500.0 grams of granular potassium sulfate (sulfate of potash) were charged into the bench-scale fluidized Wurster column and 89.9 grams of IXAN WA 50 (49.5 grams on a dry solids basis) were applied to the potassium sulfate at an average rate of 2.90 g./min. (0.00580 g. latex/g. fertilizer granule/min.). The fluidizing/drying air flow rate was maintained between 118 and 123 m³/hr. 1.51–1.57 m³/g. water removed). The air entered the fluid bed at a temperature of 42 degrees C., and exited the bed between 32 degrees and 36 degrees C. After the coating was complete, the coated product was dried for an additional 15 minutes at an air temperature of 42 degrees C. followed by 12 minutes of cooling with ambient air.

EXAMPLE 11

A series of dissolution rate tests was conducted on the coated fertilizer products of Examples 1–10 in order to measure the amount of nutrient released from the encapsulated fertilizers into water over varying periods of times. A sample of each of the coated products of Examples 1–10 was prepared and these sample products were immersed in water and the rate of dissolution of each of the products was determined after 1 hour, 1 day and 1 week of immersion.

Table 1 shows the results of the foregoing tests in terms of the cumulative nitrogen dissolution rate and, where applicable, the cumulative potassium dissolution rate (expressed in terms of $K_2O$ dissolution rate) for each of the test samples. These test results provide an indication of the amount of nutrient released from a sample of encapsulated fertilizer into water over a specified period of time.

TABLE I

| Sample | Total Nitrogen Content | Cumulative Nitrogen Dissolution Rate (% Total N) (Observation Periods) | | | Total $K_2O$ Content | Cumulative $K_2O$ Dissolution Rate (% Total $K_2O$) (Observation Periods) | | |
|---|---|---|---|---|---|---|---|---|
| | | 1 Hr | 1 Day | 7 Day | | 1 Hr | 1 Day | 7 Day |
| Example 1 | 39.1 | 3.1 | 6.0 | 9.7 | — | — | — | — |
| Example 2 | 43.6 | 7.9 | 24.1 | 56.2 | — | — | — | — |
| Example 3 | 42.2 | 2.0 | 6.3 | 14.5 | — | — | — | — |
| Example 4 | 41.4 | 5.1 | 7.5 | 13.2 | — | — | — | — |
| Example 5 | 41.6 | 4.2 | 15.3 | 26.1 | — | — | — | — |
| Example 6 | 41.5 | 2.9 | 6.5 | 13.0 | — | — | — | — |
| Example 7 (Control) | 44.7 | 66.2 | 98.2 | * | — | — | — | — |
| Example 8 | 13.7 | 5.8 | 13.6 | 18.8 | 13.7 | 0.6 | 2.7 | 5.7 |
| Example 9 | 13.6 | 9.0 | 15.5 | 28.9 | 42.7 | 7.7 | 13.1 | 19.8 |
| Example 10 | — | — | — | — | 47.4 | 2.0 | 13.0 | 30.4 |

*Testing was terminated for this sample after 1 day in view of the nearly 100% cumulative dissolution at that point.

From these tabulated results, it can be seen that the encapsulated fertilizers of the present invention demonstrate relatively low dissolution rates indicating no significant defects in the coatings which would result in rapid nutrient release. However, it can be seen that the results achieved with the product of Example 2 are indicative that coating weights at such level and lower normally are to be avoided. Furthermore, the low one week dissolution rates of the remaining samples demonstrate the effectiveness of the latex encapsulated fertilizers of the present invention to function as controlled release nutrient sources with extended fertilizer residuals. These extended residual characteristics enable the present products to be used as nursery application fertilizers.

EXAMPLE 12

A series of nutrient leaching tests were conducted in order to determine the temperature sensitivity of the release rate of the latex encapsulated fertilizers of the present invention. In this regard, the temperature sensitivity of an encapsulated fertilizer is important in determining its overall value as a controlled, slow release fertilizer. If the coating is highly temperature sensitive, it will have a release rate that varies along with the temperature at which it is used. This can create problems for fertilizers that are used in differing climates. For example, an encapsulated fertilizer with a temperature sensitive release rate might be an effective 8–9 month nursery-type product in cooler climates, such as the northern United States, but in warmer climates, like those in the southern U.S., this same product may only be effective for 4–5 months. Many of the current polymer encapsulated fertilizers are fairly temperature sensitive, and thus have higher release rates and less residual in warmer climates, where a majority of nursery-type fertilizers are used.

The tests were run on two sample encapsulated fertilizer products one of which was the product from Example 3 and the other was the product of Example 4. For comparative purposes, commercially available solvent applied polymer encapsulated fertilizers sold under the respective trademarks "Nutricote" 270 Day by Chiso-Asahi Fertilizer Company (a polyethylene coated ammonium nitrate and potassium sulfate product) and "Osmocote" 37-0-0 by Sierra Chemical Company (a dicyclopentadiene and vegetable oil copolymer encapsulated urea product) were tested. Additionally, a sulfur coated urea product (identified as "S-907" herein) was also included in the testing as a further comparative sample. The sample S-907 product was prepared by applying a 25% sulfur coating on a granular urea in a coating drum.

The testing consisted of collecting the nitrogen leached out of each of the sample encapsulated fertilizer products at both 70 degrees F. and 100 degrees F. at two week intervals. The results of these tests are set forth in Table II.

TABLE II

| Sample | 17 Days | | 31 Days | | 46 Days | |
|---|---|---|---|---|---|---|
|  | 70° F. | 100° F. | 70° F. | 100° F. | 70° F. | 100° F. |
| Example 3 | 52 | 105 | 36 | 103 | 65 | 98 |
| Example 4 | 20 | 70 | 22 | 42 | 16 | 19 |
| Nutricote 270 Day | 170 | 378 | 132 | 270 | 195 | 283 |
| Osmocote 37-0-0 | 35 | 140 | 87 | 155 | 280 | 132 |
| S-907 Sulfur Coated Urea | 238 | 330 | 140 | 197 | 128 | 215 |
| Control | 7 | 16 | 7 | 8 | 5 | 5 |
| Least Signif. Diff. (5%) | 101 | 101 | 93 | 93 | 67.5 | 67.5 |

It is evident from Table II that the nitrogen content of the leachate was consistently less for the vinylidene chloride-based latex encapsulated fertilizer samples of the present invention (Examples 3 and 4) than it was for Nutricote, Osmocote or sulfur coated urea (S-907). In addition, the temperature sensitivity of the latex coated samples of the present invention was minimal, as evidenced by the increases in nitrogen leachate at 100 degrees F. being less than the least significant difference. Accordingly, the results of this study indicate that the latex encapsulated fertilizers of this invention have low release rates and that these release rates are not influenced significantly by temperature differences.

EXAMPLE 13

A greenhouse study was conducted to determine the agronomic benefits of the encapsulated fertilizers of this invention, and to compare the agronomic performance of these new fertilizers with current nursery-type industry standards. Samples of encapsulated fertilizers were applied at a rate of 2 pounds of nitrogen per 1000 square feet to Coventry Kentucky bluegrass growing in small (4 inch diameter) pots. The fresh weight of the grass clippings was found for each of these pots at various time intervals. By monitoring the fresh weight of the clippings, and comparing the results with control pots (those without any fertilizer) and pots treated with a commercially available encapsulated fertilizer ("Nutricote" 270 Day) as well as with a sulfur coated urea product (S-907) and a pot treated with granular urea, the agronomic benefits of the present latex encapsulated fertilizers were determined.

Table III contains fresh weight data at the various time intervals.

TABLE III

| Sample | Cumulative Fresh Weight (in grams) at Number Days | | | | | | |
|---|---|---|---|---|---|---|---|
|  | 25 | 39 | 52 | 67 | 81 | 95 | 112 |
| Example 3 | 0.55 | 0.90 | 1.38 | 1.85 | 2.25 | 2.58 | 2.85 |
| Nutricote 270 Day | 0.50 | 0.65 | 0.88 | 1.08 | 1.30 | 1.58 | 1.83 |
| S-907 Sulfur Coated Urea | 0.72 | 1.50 | 2.57 | 3.39 | 3.92 | 4.24 | 4.50 |
| Granular Urea | 2.43 | 3.45 | 4.17 | 4.83 | 5.30 | 5.73 | 6.10 |
| Control | 0.36 | 0.43 | 0.50 | 0.70 | 0.80 | 0.87 | 0.95 |

Virtually any fertilizer or plant nutrient may be used in the practice of the invention including by way of example, urea, urea-formaldehyde composites, ammonium nitrate, ammonium sulfate, potassium chloride, potassium nitrate, potassium sulfate and monoammonium phosphate. In addition, a combination of active ingredients may be used, as for example, more than one fertilizer or a fertilizer and a pesticide or other non-fertilizer ingredient.

The foregoing is a description of illustrative embodiments of the invention, and it is applicants' intention in the appended claims to cover all forms which fall within the scope of the invention.

We claim:

1. A coated product comprising a water soluble core material having a water insoluble polymeric coating encapsulating said core, said encapsulating coating comprising a water-borne, polyvinylidene chlore-based latex composition which provides for the release of said water soluble core material over an extended period of time, said latex composition having a solid content, a glass transition temperature and a blocking temperature sufficient to promote said coating without causing agglomeration, said glass transition temperature being in a range of about 15°-35° C. and said blocking temperature being at least about 32° C.

2. The coated product of claim 1 wherein said core material is in particulate form.

3. The coated product of claim 1 wherein said core material is selected from the group consisting of fertilizers, pesticides, herbicides, fungicides, growth regulators, insecticides, animal and insect repellents and mixtures thereof.

4. The coated product of claim 2 wherein said latex composition is spray coated on said core material in a manner such that agglomeration of said core material is avoided, said latex composition having a water-like viscosity enabling low pressure spraying thereof onto said core material without causing shear related breakdown of said latex composition.

5. The coated product of claim 4 wherein the viscosity of said latex composition is less than about 30 centipoise.

6. The coated product of claim 1 wherein said latex composition has a solid content of greater than about 50 percent by weight (on a solid basis).

7. The coated product of claim 1 wherein said spray coating temperature is in the range of about 35°-60° C.

8. The coated product of claim 1 wherein said latex composition is selected from the group consisting of copolymer blends of predominately vinylidene chloride monomers and ethylenically unsaturated comonomers selected from the group consisting of methyl methacrylates, acrylonitriles and methyl acrylates, vinylidene chloride-vinyl chloride copolymers and mixtures thereof.

9. The coated product of claim 8 wherein said copolymer blends of vinylidene chloride monomers and ethylenically unsaturated comonomers contain about 80–92% by weight of said vinylidene chloride monomers and about 5–14% by weight of said ethylenically unsaturated comonomers.

10. The coated product of claim 9 wherein said latex composition contains about 0.05–0.5% by weight of an anionic surfactant and about 3–5% by weight of a nonionic surfactant.

11. The coated product of claim 10 wherein said anionic surfactant is selected from the group consisting of sodium alkylbenzensulfonate, sodium salts of alkyl sulfonic acid esters, sodium salts of sulfosuccinic acid alkyl esters sodium alkylsulfonates, sodium alkylidiphenylether sulfonates, sulfuric acid esters of alkylophenolpolyethylene oxides and mixtures thereof.

12. The coated product of claim 10 wherein said nonionic surfactant is selected from the group consisting of alkylethers, alkylphenol ethers, fatty acid esters of polyethylene oxides and mixtures thereof.

13. The coated product of claim 8 wherein the latex composition encapsulating said core is coated thereon at a coating weight of from about 4% to about 20% by weight.

14. The coated product of claim 8 wherein said latex composition has a maximum moisture vapor transmission rate for an 0.1 mil film of about 2.0 grams per 100 square inches per 24 hours at 100 degrees F. and 90% relative humidity.

15. A controlled-release fertilizer product comprising a core containing a water soluble fertilizer in particulate form encapsulated within a coating, said coating comprising a water-borne, polyvinylidene chloride-based latex composition having a solids content, a glass transition temperature and a blocking temperature sufficient to promote said coating without causing agglomeration and having moisture barrier properties enabling slow, controlled release of the fertilizer core particles, said glass transition temperature being in a range of about 15°–35° C. and said blocking temperature being at least about 32° C.

16. The controlled-release fertilizer product of claim 15 wherein said latex composition is spray coated on said core particles in a manner such that agglomeration of said particles is avoided, said latex composition having a viscosity of less than about 30 centipoise, a solids content of greater than about 50 percent by weight (on a solids basis).

17. The controlled-release fertilizer product of claim 16 wherein said glass transition temperature is in a range from a lower limit of about 30 degrees C. below the temperature at which said spray coating is performed to an upper limit approaching but not exceeding said spray coating temperature.

18. The controlled-release fertilizer product of claim 17 wherein said spray coating temperature is in the range of about 35°–60° degrees C.

19. The controlled-release fertilizer product of claim 15 wherein said latex composition is selected from the group consisting of copolymer blends of predominately vinylidene chloride monomers and ethylenically unsaturated comonomers selected from the group consisting of methyl methacrylates, acrylonitriles and methyl acrylates, vinylidene chloride-vinyl chloride copolymers and mixtures thereof.

20. The controlled-release fertilizer product of claim 19 wherein said copolymer blends of vinylidene chloride monomers and ethylenically unsaturated comonomers contain about 80–92% by weight of said vinylidene chloride monomers and about 5–14% by weight of said ethylenically unsaturated comonomers.

21. The controlled-release fertilizer product of claim 20 wherein said latex composition contains about 0.05–0.5% by weight of an anionic surfactant and about 3–5% by weight of a nonionic surfactant.

22. The controlled-release fertilizer product of claim 21 wherein said anionic surfactant is selected from the group consisting of sodium alkylbenzenesulfonate, sodium salts of alkyl sulfonic acid esters, sodium salts of sulfosuccinic acid alkyl esters, sodium alkylsulfonates, sodium alkylidiphenylether sulfonates, sulfuric acid esters of alkylophenolpolyethylene oxides and mixtures thereof.

23. The controlled-release fertilizer product of claim 21 wherein said nonionic surfactant is selected from the group consisting of alkylethers, alkylphenol ethers, fatty acid esters of polyethylene oxides and mixtures thereof.

24. The controlled-release fertilizer product of claim 19 wherein the latex composition encapsulating said core is coated thereon at a coating weight of from about 4% to about 20% by weight.

25. The controlled-release fertilizer product of claim 19 wherein said latex composition has a maximum moisture vapor transmission rate for an 0.1 mil film of about 2.0 grams per 100 square inches per 24 hours at 100 degrees F. and 90% relative humidity.

* * * * *

UNITED STATES PATENT AND TRADEMARK OFFICE
CERTIFICATE OF CORRECTION

PATENT NO. : 5,186,732
DATED : February 16, 1993
INVENTOR(S) : Harold E. Thompson and Richard A. Kelch It is certified that error appears in the above-indentified patent and that said Letters Patent is hereby corrected as shown below:

Column 5, lines 12-13, change "Solid-s" to --Solids--.

Column 10, line 43, delete ";" before --$m^3$/hr.--.

Column 14, line 29, change "chlore-based" to --chloride-based--.

Signed and Sealed this

Twenty-fifth Day of January, 1994

*Attest:*

BRUCE LEHMAN

*Attesting Officer*     *Commissioner of Patents and Trademarks*